(12) United States Patent
Puradchithasan et al.

(10) Patent No.: US 9,953,529 B2
(45) Date of Patent: Apr. 24, 2018

(54) DIRECT VEHICLE TO VEHICLE COMMUNICATIONS

(71) Applicant: GM GLOBAL TECHNOLOGY OPERATIONS LLC, Detroit, MI (US)

(72) Inventors: Suresh Puradchithasan, Toronto (CA); Peter Andres, Ginsheim-Gustavsburg (DE); Munib Ahmed Yusuf, Scarborough (CA)

(73) Assignee: GM Global Technology Operations LLC, Detroit, MI (US)

( * ) Notice: Subject to any disclaimer, the term of this patent is extended or adjusted under 35 U.S.C. 154(b) by 286 days.

(21) Appl. No.: 14/803,569

(22) Filed: Jul. 20, 2015

(65) Prior Publication Data

US 2017/0025006 A1    Jan. 26, 2017

(51) Int. Cl.
*G08G 1/00* (2006.01)
*G08G 1/0967* (2006.01)
*B60Q 9/00* (2006.01)
*G06K 9/00* (2006.01)

(52) U.S. Cl.
CPC ......... *G08G 1/096791* (2013.01); *B60Q 9/00* (2013.01); *G08G 1/09675* (2013.01); *G08G 1/096716* (2013.01); *G06K 9/00791* (2013.01)

(58) Field of Classification Search
CPC ............... B60Q 9/00; G08G 1/096791; G08G 1/096716; G08G 1/09675; G06K 9/00791
USPC .............................. 340/902–905, 937, 425.5
See application file for complete search history.

(56) References Cited

U.S. PATENT DOCUMENTS

2009/0069954 A1* 3/2009 Aladesuyi ............. B60R 25/102
701/2

* cited by examiner

*Primary Examiner* — Daryl Pope
(74) *Attorney, Agent, or Firm* — Quinn IP Law

(57) ABSTRACT

A method of communicating a notification includes identifying an issue associated with a target vehicle. A location of the target vehicle is determined, and a notification signal is broadcast from a host vehicle. The notification signal includes the location of the target vehicle and the identified issue associated with the target vehicle. The broadcast notification signal is received by the target vehicle, which determines that the received notification signal is intended for the target vehicle, by comparing a current location of the target vehicle to the location of the target vehicle included in the notification signal. When the target vehicle determines that the broadcast notification signal received from the host vehicle is intended for the target vehicle, the target vehicle may issue an alert signal to alert an occupant of the target vehicle of the issue associated with the target vehicle.

19 Claims, 1 Drawing Sheet

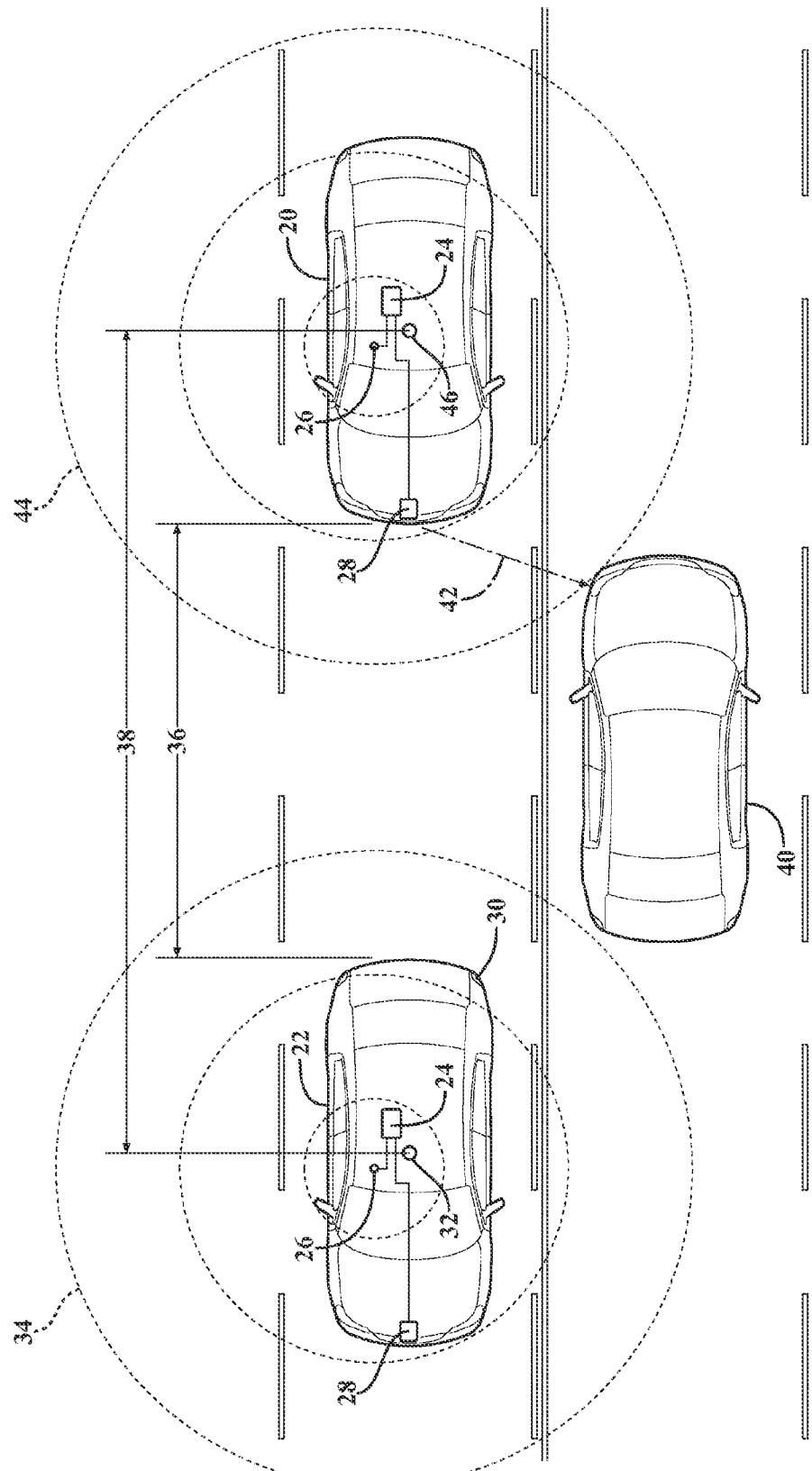

DIRECT VEHICLE TO VEHICLE COMMUNICATIONS

TECHNICAL FIELD

The disclosure generally relates to a method of communicating a notification from a host vehicle to a target vehicle, and a vehicle capable of communicating with another vehicle.

BACKGROUND

Vehicles may be equipped with a communications system and a transceiver that allows the vehicle to receive a data signal, such as from a GPS satellite or a roadside broadcast unit, and also transmit or broadcast a data signal, such as a position and speed of the vehicle. However, the data signal that the vehicle broadcasts or transmits is not specifically identifiable with that specific vehicle, i.e., there is no specific vehicle identifier included in the vehicle data signals. Accordingly, all vehicles within range of the transceiver may receive the broadcast data signal, and the vehicles receiving the broadcast data signal are unable to specifically identify the exact vehicle which is transmitting the data signal, and are also unable to determine which specific vehicle, if any, the data signal is intended for.

SUMMARY

A method of communicating a notification from a host vehicle to a target vehicle is provided. The method includes identifying an issue associated with the target vehicle. A location of the target vehicle is determined with a communications control module of the host vehicle. A notification signal is broadcast with a transceiver of the host vehicle. The notification signal includes the location of the target vehicle and the identified issue associated with the target vehicle. The broadcast notification signal is received with a transceiver of the target vehicle. The communications control module of the target vehicle determines that the broadcast notification signal received from the host vehicle is intended for the target vehicle, by comparing a current location of the target vehicle stored in a memory of the communications control module of the target vehicle to the location of the target vehicle included in the notification signal received by the target vehicle. When the target vehicle determines that the broadcast notification signal received from the host vehicle is intended for the target vehicle, the communications control module of the target vehicle may issue an alert signal to alert an occupant of the target vehicle of the issue associated with the target vehicle.

A vehicle is also provided. The vehicle includes a communications control module, which includes tangible, non-transitory memory on which are recorded computer-executable instructions, including a notification algorithm. A transceiver is in electronic communication with the communications control module, and is operable to broadcast electronic signals from the communications control module, and receive electronic signals and communicate the received electronic signals to the communications control module. A camera module is in electronic communication with the communications control module, and is operable to measure a distance to an object. The notification algorithm is operable to receive an identification signal with the transceiver, including position coordinates of a respective vehicle. The notification algorithm determines which one of a plurality of different vehicles the identification signal was received from, based on the position coordinates included in the identification signal, and a distance measured to each of the plurality of different vehicles with the camera module. The notification algorithm defines the one of the plurality of different vehicles that the identification signal was received from as a target vehicle, and determines a location of the target vehicle from the position coordinates of the target vehicle included in the identification signal received from the target vehicle. The notification algorithm broadcasts a notification signal with the transceiver. The notification signal includes the location of the target vehicle and an issue associated with the target vehicle.

Accordingly, the notification algorithm of the communications control module of the host vehicle uses the position coordinates broadcast from the target vehicle in the identification signal and the distance measured from the host vehicle to the target vehicle to identify or verify which vehicle the identified issue is associated with. Once the target vehicle is identified, the host vehicle broadcasts the notification signal, which includes the identified issue associated with the target vehicle and the position of the target vehicle. The target vehicle may verify that it is the intended recipient of the notification signal by comparing the known position of the target vehicle with the position included in the notification signal. In this manner, the position of the target vehicle is used as the specific vehicle identifier that enables the intended target vehicle to verify that the notification signal is intended for it, without requiring that each vehicle broadcast a unique identifier that would be traceable, thereby maintaining the privacy of each vehicle. The issue associated with the target vehicle may include, for example, an alert of an inoperable light, an alert of a flat tire, and alert associated with a trailer or cargo of the target vehicle, or any other information that may be useful to the driver of the target vehicle.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic plan view showing a host vehicle and a target vehicle communicating with each other.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to FIG. 1, wherein like numerals indicate like parts throughout FIG. 1, a method of communicating a notification from a host vehicle 20 to a target vehicle 22 is generally shown. Referring to FIG. 1, the host vehicle 20 and the target vehicle 22 preferably each include a communications control module 24, a transceiver 26, and a camera module 28, and are configured for wireless vehicle to vehicle communication. However, the target vehicle 22 does not necessarily have to be equipped with the cameral module 28. The operation of the target vehicle 22 described in the written specification herein does not require the use of the cameral module 28. However, if the target vehicle 22 is not equipped with the cameral module 28, then the target vehicle would be incapable of functioning as a host vehicle 20 as described herein.

The communications control module 24, the transceiver 26, and the camera module 28 of the host vehicle 20 and the target vehicle 22 may each include the same capabilities. The communications control modules 24, the transceivers 26, and the camera modules 28 for both the host vehicle 20 and the target vehicle 22 are described below with reference to a generic communications control module 24, a generic transceiver 26, and a generic camera module 28 respectively. Unless otherwise indicated by the specification, it should be appreciated that description of the communications control module 24, the transceiver 26, and the camera module 28 applies to the communications control module 24, the transceiver 26, and the cameral module of both the host vehicle 20 and the target vehicle 22 respectively. Additionally, the specific steps and/or processes of the communications control module 24, the transceiver 26, and/or the camera module 28 respectively, that are specific to the host vehicle 20 and/or the target vehicle 22, will be noted in the written specification.

The communications control modules 24 are operable to control the wireless vehicle to vehicle communications of their respective host vehicle 20 or target vehicle 22. The communications control module 24 may include a computer and/or processor, and include all software, hardware, memory, algorithms, connections, sensors, etc., necessary to manage and control the operation of the wireless vehicle to vehicle communications. As such, a method described below may be embodied as a program or algorithm (hereinafter referred to as a notification algorithm) operable on the communications control modules 24. It should be appreciated that the communications control modules 24 may include any device capable of analyzing data from various sensors, comparing data, making the necessary decisions required to control the operation of the wireless vehicle to vehicle communications as described herein, and execute the required tasks necessary to control the operation of the wireless vehicle to vehicle communications.

The communications control modules 24 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory may include any non-transitory/tangible medium which participates in providing data or computer-readable instructions. Memory may be non-volatile or volatile. Non-volatile media may include, for example, optical or magnetic disks and other persistent memory. Example volatile media may include dynamic random access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

The communications control modules 24 include tangible, non-transitory memory on which are recorded computer-executable instructions, including the notification algorithm. The processor of the communications control modules 24 are configured for executing the notification algorithm. The notification algorithm implements the method of communicating a notification from the host vehicle 20 to the target vehicle 22, described in greater detail below.

The transceivers 26 are disposed in electronic communication with their respective communications control module 24. The transceivers 26 are operable to both broadcast and receive electronic signals. More specifically, the transceivers 26 are operable to broadcast electronic signals from their respective communications control module 24, and receive electronic signals and communicate the received electronic signals to their respective communications control module 24. The transceivers 26 may include any device capable of transmitting or broadcasting a signal, and also receiving a signal, and suitable for use in a vehicle.

The camera modules 28 are disposed in electronic communication with their respective communications control module 24 of its respective host vehicle 20 or target vehicle 22. The camera modules 28 are operable to record visual images as is known in the art. Typically, the camera modules 28 are located at a forward end of their respective vehicle. However, it should be appreciated that the camera modules 28 may be located at some other location of their respective vehicle. Additionally, while the written description only refers to a single camera module 28 on the host vehicle 20, it should be appreciated that each of the host vehicle 20 and the target vehicle 22 may include a plurality of camera modules 28.

In addition to the normal functions of the camera modules 28, the camera modules 28 are operable to measure a distance to an object, such as another vehicle within sight of the respective camera module 28. The camera modules 28 may include all software and equipment necessary to measure the distance to the object, and provide the measured distance 36 to their respective communications control module 24 as data. Alternatively, the camera module 28 may sense the necessary data, and communicate the necessary data to their respective communications control module 24, so that their respective communications control module 24 may calculate the distance to the object. The camera module 28 may include any camera capable of the functions described herein, and capable of being used on a vehicle.

The notification algorithm is operable to perform the various steps and/or processes described below, in order to execute the method of communicating a notification from the host vehicle 20 to the target vehicle 22. The method includes identifying an issue 30 associated with the target vehicle 22. The issue 30 associated with the target vehicle 22 may include for example, but is not limited to, an issue 30 related to a light on the target vehicle 22, an issue 30 related to a trailer being towed by the target vehicle 22, an issue 30 related to tire inflation of the target vehicle 22, an issue 30 related to the fuel door of the target vehicle 22, an issue 30 related to excessive smoke emanating from the target vehicle 22, etc. As shown in FIG. 1, the issue 30 associated with the target vehicle 22 is indicated at 30, and may include, for example, an inoperable taillight fixture.

The issue 30 associated with the target vehicle 22 may be automatically identified and/or detected by a sensing system of the host vehicle 20, or independently identified and/or detected by an occupant of the host vehicle 20. The sensing system may include, for example, the camera module 28 of the host vehicle 20, or some other system of the host vehicle 20 capable of detecting an issue 30 with other vehicles. For example, the camera module 28 on the host vehicle 20 may be programmed to detect pre-defined issues 30 with adjacent vehicles, such as but not limited to an inoperable headlight or taillight. The camera module 28 on the host vehicle 20 may send or input the issue 30 associated with the target vehicle 22 into the communications control module 24 of the host vehicle 20.

If the issue 30 associated with the target vehicle 22 is identified by an occupant of the host vehicle 20, then the identified issue 30 associated the the target vehicle 22 must be manually input into the communications control module 24 of the host vehicle 20. For example, the communications control module 24 of the host vehicle 20 may include a plurality of pre-defined issues 30 that may be displayed on a touchscreen display. Manually inputting the issue 30 associated with the target vehicle 22 may include the occupant manually selecting one of the plurality of pre-defined issues 30 on the touchscreen display to input the issue 30. It should be appreciated that the issue 30 associated with the target vehicle 22 may be manually input into the communications control module 24 of the host vehicle 20 in some other manner not specifically described herein.

Once an issue 30 with the target vehicle 22 has been identified, a location of the target vehicle 22 must be determined. The location of the target vehicle 22 is generally indicated at 32. The communications control module 24 of the host vehicle 20 may determine the location of the target vehicle 22 in any suitable manner. For example, vehicles equipped for wireless vehicle to vehicle communications continuously broadcast a signal, hereinafter referred to as an identification signal 34, which includes position coordinates of that vehicle. Accordingly, the method may include broadcasting the identification signal 34 with the transceiver 26 of the target vehicle 22. The position coordinates may be referred to as Global Positioning System (GPS) coordinates, and define and/or describe the location of the vehicle within a pre-defined tolerance of the GPS system. It is known to those skilled in the art that the position coordinates included in the identification signal 34 and broadcast from vehicles do not include a specific vehicle or computer identifier or IP address that would enable other vehicles or computing systems receiving the identification signal 34 to identify that specific vehicle. As such, transceivers 26 receiving the identification signal 34 receive a signal providing information of the location of a vehicle, but do not receive a name or identifier of the vehicle to enable other vehicles and/or computing systems to communicate directly with the vehicle that broadcast the identification signal 34. The identification signal 34 that is broadcast from the transceiver 26 of the target vehicle 22, is received with the transceiver 26 of the host vehicle 20.

A distance between the target vehicle 22 and the host vehicle 20 may be measured with the camera module 28 of the host vehicle 20, and communicated to the communications control module 24 of the host vehicle 20. The distance that is measured by the camera module 28 is hereinafter referred to as the measured distance 36. A distance between the target vehicle 22 and the host vehicle 20 is also calculated with the communications control module 24 of the host vehicle 20. The distance calculated by the communications control module 24 of the host vehicle 20 is hereinafter referred to as the calculated distance 38. The calculated distance 38 is calculated by determining the distance between a current position of the host vehicle 20, generally indicated at 46, stored in a memory of the communications control module 24 of the host vehicle 20, and the position coordinates of the target vehicle 22 included in the identification signal 34 received by the host vehicle 20. As used herein, the term "current" should be interpreted to include either an actual position at the present time, or the most recent position saved in the memory of a control module. Accordingly, the term "current position of the host vehicle 20" may include either the position of the host vehicle 20 at that specific time, or the most recent position of the host vehicle 20 saved in the memory of the communications control module 24 of the host vehicle 20.

The communications control module 24 of the host vehicle 20 compares the measured distance 36 between the target vehicle 22 and the host vehicle 20 with the calculated distance 38 between the target vehicle 22 and the host vehicle 20 to determine if the identification signal 34 received by the host vehicle 20 was transmitted from the target vehicle 22. The communications control module 24 of the host vehicle 20 may determine that the identification signal 34 received by the host vehicle 20 was transmitted from the target vehicle 22 when the measured distance 36 between the target vehicle 22 and the host vehicle 20 is equal to or within a pre-defined range of the calculated distance 38 between the target vehicle 22 and the host vehicle 20. In other words, if the distance measured by the camera module 28 to a specific vehicle is the same as the distance calculated based on the position coordinates received in the identification signal 34, then the vehicle broadcasting the identification signal must be the same as the vehicle that the camera module 28 is measuring the distance to. For example, the communications control module 24 of the host vehicle 20 compares the measured distance 36 to the target vehicle 22 to the calculated distance 38. Because the measured distance 36 is within the pre-defined range, i.e., an allowable tolerance of the calculated distance 38, the communications control module 24 of the host vehicle 20 may determine that the target vehicle 22 is the vehicle that has the issue 30 associated with it. The pre-defined range or tolerance between the measured distance 36 and the calculated distance 38 may be defined based upon standard lane widths and/or vehicle lengths. For example, half a lane width may be sufficient to distinguish vehicles in different lanes, so the pre-defined range may be defined as a range of +/−1 m (total variance of 2 m). It should be appreciated that the pre-defined range may vary from the exemplary range described herein.

Alternatively, the communications control module 24 of the host vehicle 20 may determine that the identification signal 34 received by the host vehicle 20 was not transmitted from the target vehicle 22 when the measured distance 36 between the target vehicle 22 and the host vehicle 20 is not equal to or within pre-defined range of the calculated distance 38 between the target vehicle 22 and the host vehicle 20. In other words, if the distance measured by the camera module 28 to a specific vehicle is not the same as the distance calculated based on the position coordinates received in the identification signal 34, then the specific vehicle broadcasting the identification signal 34 must be a different vehicle than the vehicle that the camera module 28 is measuring the distance to. For example, the communications control module 24 of the host vehicle 20 may measure a distance 42 to a third vehicle 40, and compare the distance 42 to the calculated distance 38. Because the distance 42 varies from the calculated distance 38 by more than the allowable tolerance, the communications control module 24 of the host vehicle 20 may determine that the third vehicle 40 is not the target vehicle 22 that has the issue 30 associated with it.

If the communications control module 24 of the host vehicle 20 determines that the vehicle that the camera module 28 is measuring the distance to, i.e., the measured distance 36, is the same vehicle that broadcast the identification signal 34, then the communications control module 24 of the host vehicle 20 may define that vehicle as the target vehicle 22, and may use the position coordinates included in the received identification signal 34 as the position of the target vehicle 22.

If the issue 30 associated with the target vehicle 22 is manually input into the communications control module 24 of the host vehicle 20, then the occupant that input the issue 30 may be required to also input an identifier of the target vehicle 22 into the communications control module 24 of the host vehicle 20. For example, the communications control module 24 may display a map showing the host vehicle 20 and all other vehicles positioned around the host vehicle 20, based on identification signals 34 from all adjacent vehicles or information from one or more camera modules 28 of the host vehicle 20, thereby allowing the occupant to select which vehicle the issue 30 is associated with, thereby inputting the identifier of the target vehicle 22 into the communications control module 24 of the host vehicle 20. Alternatively, the communications control module 24 may assume that the issue 30 is in reference to a vehicle immediately next to the host vehicle 20. The camera module 28 may be used to measure the distance to the adjacent vehicle. In other embodiments, the driver of the host vehicle 20 may be prompted to enter if the target vehicle is either immediately in front of, behind, on the left side, or on the right side of the host vehicle 20. If the host vehicle includes a camera module 28 pointed in the selected direction, the camera module 28 may then capture the measured distance 36. It is contemplated that notification of the target vehicle may be limited by the availability and/or direction of aim of the cameral module(s) 28 on the host vehicle 20, and their ability to see or sense the target vehicle 22. Once the occupant has identified the specific vehicle that the issue 30 is associated with, the communications control module 24 may define that vehicle as the target vehicle 22, and use the location of that vehicle as the location of the target vehicle 22.

Because the host vehicle 20 and/or the target vehicle 22 may be moving, determining the location of the target vehicle 22 may include estimating a future location of the target vehicle 22 with the communications control module 24 of the host vehicle 20. The communications control module 24 of the host vehicle 20 may estimate the future location of the target vehicle 22 in any suitable manner. For example, the communications control module 24 of the host vehicle 20 may identify a heading and a speed of the target vehicle 22 with information from the camera module 28 on the host vehicle 20, or based on the change in position coordinates included in the identification signal 34 over time. Additionally, estimating the future location of the target vehicle 22 may further include calculating the future location of the target vehicle 22 at a specific time, based on the identified heading and speed of the target vehicle 22. In other words, the communications host vehicle 20 must not only calculate the future location of the target vehicle 22, but must also calculate what point in time the target vehicle 22 will be at that future location.

Once the communications control module 24 of the host vehicle 20 has determined the location of the target vehicle 22, and/or the future location of the target vehicle 22 at a specific time, the communications control module 24 of the host vehicle 20 broadcasts a notification signal 44 with the transceiver 26 of the host vehicle 20. The notification signal 44 includes the location of the target vehicle 22 and the identified issue 30 associated with the target vehicle 22. The location of the target vehicle 22 may include the current location of the target vehicle 22, and/or the future location of the target vehicle 22 at the specific time. As noted above, the term "current" should be interpreted to include either an actual location at the present time, or the most recent location saved in the memory of a control module. Accordingly, the term "current location of the target vehicle 22" may include either the position of the target vehicle 22 at that specific time, or the most recent position of the target vehicle 22 saved in the memory of the communications control module 24 of the target vehicle 22. If the notification signal 44 does not include the future location at the specific time, then the notification signal 44 may alternatively include a specific time at which the current location of the target vehicle 22 was determined. The notification signal 44 does not include identification specific to the target vehicle 22, such as a name, computer name, IP address, etc. Rather, the notification signal 44 includes the location of the target vehicle 22, which enables the target vehicle 22 to identify itself. Basically, the notification signal 44 includes the location of the target vehicle 22 as an address or identifier of the target vehicle 22.

The notification signal 44 may be automatically broadcast when the issue 30 associated with the target vehicle 22 is automatically detected with the sensing system of the host vehicle 20. Alternatively, the notification signal 44 may be broadcast on the command of the occupant when the issue 30 associated with the target vehicle 22 is manually input into the communications control module 24 of the host vehicle 20.

The notification signal 44, which is broadcast from the transceiver 26 of the host vehicle 20, is received with the transceiver 26 of the target vehicle 22, and communicated to the communications control module 24 of the target vehicle 22. Upon receiving the notification signal 44, the communications control module 24 of the target vehicle 22 does not automatically know that the notification signal 44 is intended for that specific vehicle, because the notification signal 44 does not include a specific identifier, e.g., IP address, which identifies the intended target vehicle 22. Accordingly, the communications control module 24 of the target vehicle 22 must determine if the notification signal 44 received from the host vehicle 20 was intended for that specific vehicle, or a different vehicle.

In order to determine if the notification signal 44 is intended for the target vehicle 22, the communications control module 24 of the target vehicle 22 compares a current location of the target vehicle 22, stored in a memory of the communications control module 24 of the target vehicle 22, to the location of the target vehicle 22 included in the notification signal 44 received by the target vehicle 22. If the target vehicle 22 is moving and the above described process is executed quickly enough, or if the target vehicle 22 is stationary, then the communications control module 24 of the target vehicle 22 may determine if the notification signal 44 is intended for it based on the current location of the target vehicle 22. However, if the execution of the above described process is not quick enough, then the communications control module 24 of the target vehicle 22 may determine that the broadcast notification signal 44 received from the host vehicle 20 is intended for the target vehicle 22, by comparing the location of the target vehicle 22 at the specific time to the location of the target vehicle 22 at the specific time included in the notification signal 44 received by the target vehicle 22, or by comparing the future location of the target vehicle 22 at the specific time to the current location of the target vehicle 22 stored in the memory of the communications control module 24 of the target vehicle 22.

If communications control module 24 of the target vehicle 22 determines that the current location of the target vehicle 22 stored in the memory of the communications control module 24 of the target vehicle 22 is within the pre-defined range of the location of the target vehicle 22 included in the notification signal 44 transmitted from the host vehicle 20, the communications control module 24 of the target vehicle 22 may determine that it is the target vehicle 22, i.e., the intended recipient of the notification signal 44. However, if communications control module 24 of the target vehicle 22 determines that the current location of the target vehicle 22 stored in the memory of the communications control module 24 of the target vehicle 22 is not within the pre-defined range of the location of the target vehicle 22 included in the notification signal 44 transmitted from the host vehicle 20, the communications control module 24 of the target vehicle 22 may determine that it is not the target vehicle 22, i.e., not the intended recipient of the notification signal 44.

If the communications control module 24 of the target vehicle 22 determines that it is the intended recipient of the notification signal 44, i.e., the target vehicle 22, the communications control module 24 of the target vehicle 22 may issue or send an alert signal to alert the occupant of the target vehicle 22 of the issue 30 associated with the target vehicle 22. The alert signal may include a warning light, a notification of a display of the communications control module 24, an audible or visual alarm, or some other form of an alert signal capable of notifying the occupant of the specifics of the issue 30 associated with the target vehicle 22.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A method of communicating a notification from a host vehicle to a target vehicle, the method comprising:
    identifying an issue associated with the target vehicle;
    determining a location of the target vehicle with a communications control module of the host vehicle, wherein determining the location of the target vehicle includes estimating a future location of the target vehicle;
    broadcasting a notification signal with a transceiver of the host vehicle, wherein the notification signal includes the location of the target vehicle and the identified issue associated with the target vehicle;
    receiving the broadcast notification signal with a transceiver of the target vehicle;
    determining that the broadcast notification signal received from the host vehicle, is intended for the target vehicle, by comparing a current location of the target vehicle stored in a memory of a communications control module of the target vehicle to the location of the target vehicle included in the notification signal received by the target vehicle, with the communications control module of the target vehicle; and
    issuing an alert signal with the communications control module of the target vehicle, to alert an occupant of the target vehicle of the issue associated with the target vehicle.

2. The method set forth in claim 1 further comprising broadcasting an identification signal with the transceiver of the target vehicle, wherein the identification signal includes position coordinates of the target vehicle.

3. The method set forth in claim 2 further comprising receiving the identification signal broadcast from the target vehicle, with the transceiver of the host vehicle.

4. The method set forth in claim 3 wherein determining the location of the target vehicle includes measuring a distance between the target vehicle and the host vehicle with a camera module of the host vehicle.

5. The method set forth in claim 4 wherein determining the location of the target vehicle includes calculating a distance between the target vehicle and the host vehicle, with the communications control module of the host vehicle, from a current position of the host vehicle stored in a memory of the communications control module of the host vehicle and the position coordinates of the target vehicle included in the identification signal received by the host vehicle.

6. The method set forth in claim 5 wherein determining the location of the target vehicle includes comparing the measured distance between the target vehicle and the host vehicle with the calculated distance between the target vehicle and the host vehicle, with the communications control module of the host vehicle, to determine if the identification signal received by the host vehicle was transmitted from the target vehicle.

7. The method set forth in claim 6 wherein the communications control module of the host vehicle determines that the identification signal received by the host vehicle was transmitted from the target vehicle when the measured distance between the target vehicle and the host vehicle is within a pre-defined range of the calculated distance between the target vehicle and the host vehicle.

8. The method set forth in claim 6 wherein the communications control module of the host vehicle determines that the identification signal received by the host vehicle was not transmitted from the target vehicle when the measured distance between the target vehicle and the host vehicle is not within a pre-defined range of the calculated distance between the target vehicle and the host vehicle.

9. The method set forth in claim 1 wherein identifying the issue associated with the target vehicle includes detecting the issue with a sensing system of the host vehicle.

10. The method set forth in claim 9 wherein broadcasting the notification signal is further defined as automatically broadcasting the notification signal when the issue associated with the target vehicle is detected with the sensing system of the host vehicle.

11. The method set forth in claim 1 wherein identifying the issue associated with the target vehicle includes manually inputting the issue associated with the target vehicle into the communications control module of the host vehicle.

12. The method set forth in claim 11 wherein the communications control module of the host vehicle includes a plurality of pre-defined issues, and wherein manually inputting the issue associated with the target vehicle includes manually selecting one of the plurality of pre-defined issues.

13. The method set forth in claim 12 wherein manually inputting the issue associated with the target vehicle includes inputting an identifier of the target vehicle into the communications control module of the host vehicle.

14. The method set forth in claim 1 wherein estimating a future location of the target vehicle includes identifying a heading and a speed of the target vehicle with the communications control module of the host vehicle.

15. The method set forth in claim 14 wherein estimating the future location of the target vehicle includes calculating a future location of the target vehicle at a specific time, based on the identified heading and speed of the target vehicle.

16. The method set forth in claim 15 wherein the notification signal includes a specific time at which the location of the target vehicle was determined, and wherein determining that the broadcast notification signal received from the host vehicle is intended for the target vehicle, is further defined as determining that the broadcast notification signal received from the host vehicle is intended for the target vehicle by comparing the current location of the target vehicle at the specific time to the location of the target vehicle at the specific time included in the notification signal received by the target vehicle.

17. A vehicle comprising:
a communications control module including tangible, non-transitory memory on which are recorded computer-executable instructions, including a notification algorithm;
a transceiver in electronic communication with the communications control module, and operable to broadcast electronic signals from the communications control module, and receive electronic signals and communicate the received electronic signals to the communications control module; and
a camera module in electronic communication with the communications control module, and operable to measure a distance to an object;
wherein the notification algorithm is operable to:
receive an identification signal with the transceiver, including position coordinates of a respective vehicle;
determine which one of a plurality of different vehicles the identification signal was received from, based on the position coordinates included in the identification signal and a distance measured to each of the plurality of different vehicles with the camera module;
define the one of the plurality of different vehicles that the identification signal was received from as a target vehicle;
determine a location of the target vehicle from the position coordinates of the target vehicle included in the identification signal received from the target vehicle; and
broadcast a notification signal with the transceiver, wherein the notification signal includes the location of the target vehicle and an identified issue associated with the target vehicle.

18. The vehicle set forth in claim 17 wherein the notification algorithm is operable to automatically identify the issue with the target vehicle, with information received from the camera module.

19. The vehicle set forth in claim 17 wherein the communications control module includes a memory having a plurality of pre-defined issues stored therein, and wherein the notification algorithm is operable to display the pre-defined issues, receive an input selecting one of the pre-defined issues, and broadcast the notification signal with the selected pre-defined issue.

* * * * *